(12) United States Patent
Reid

(10) Patent No.: US 6,274,038 B1
(45) Date of Patent: *Aug. 14, 2001

(54) WATER PURIFIER WITH ADJUSTABLE VOLUME IN DWELL PASSAGE

(76) Inventor: Roger P. Reid, 1904 Industrial Way, Caldwell, ID (US) 83605

(*) Notice: Subject to any disclaimer, the term of this patent is extended or adjusted under 35 U.S.C. 154(b) by 0 days.

This patent is subject to a terminal disclaimer.

(21) Appl. No.: 09/319,427

(22) PCT Filed: Dec. 5, 1997

(86) PCT No.: PCT/US97/22101

§ 371 Date: Jun. 4, 1999

§ 102(e) Date: Jun. 4, 1999

(87) PCT Pub. No.: WO98/24531

PCT Pub. Date: Jun. 11, 1998

Related U.S. Application Data

(63) Continuation of application No. 08/761,651, filed on Dec. 6, 1996, now Pat. No. 5,908,553.

(51) Int. Cl.[7] ............................................ C02F 1/76
(52) U.S. Cl. .................... 210/206; 210/209; 210/266; 210/288; 210/438; 210/440; 210/458; 210/502.1
(58) Field of Search .................. 210/198.1, 206, 210/209, 266, 288, 438, 440, 458, 502.1; 422/261

(56) References Cited

U.S. PATENT DOCUMENTS

| | | | |
|---|---|---|---|
| 3,375,933 | * | 4/1968 | Rodman ........................... 210/502.1 |
| 4,645,601 | * | 2/1987 | Regunathan et al. ............. 210/433.2 |
| 4,888,118 | * | 12/1989 | Barnes et al. ......................... 210/668 |
| 5,116,500 | * | 5/1992 | Ceaton ................................. 210/238 |
| 5,126,044 | * | 6/1992 | Magnusson et al. ................ 210/136 |
| 5,308,482 | * | 5/1994 | Mead .................................. 210/207 |
| 5,401,399 | * | 3/1995 | Magnusson et al. ................ 210/136 |
| 5,407,573 | * | 4/1995 | Hughes ................................ 210/266 |
| 5,908,553 | * | 6/1999 | Reid .................................... 210/206 |

FOREIGN PATENT DOCUMENTS

| | | | |
|---|---|---|---|
| 2638100 | * | 10/1988 | (FR) . |
| 1072227 | * | 6/1967 | (GB) . |
| 2227998 | * | 8/1990 | (GB) . |

* cited by examiner

*Primary Examiner*—Matthew O. Savage
(74) *Attorney, Agent, or Firm*—Ken J. Pedersen; Barbara S. Pedersen

(57) ABSTRACT

A water filter is packaged in a way that permits longer dwell time and greater volume in a dwell passage of the water filter. In one embodiment the water filter includes an influent passage where a biocide is imparted to the water, a dwell passage where the water remains in contact with the biocide for at least a predetermined duration, and an effluent passage where the biocide is removed from the water. The water filter includes a replaceable cartridge mounted in a pressure vessel. By arranging the dwell passage to include a pan shaped portion in the bottom of the vessel and an axial portion along the extremity of the cartridge, greater volume, greater mixing, and more effective disinfecting result. Another embodiment includes a series of baffles on the exterior surface of the cartridge that create further turbulence for mixing the biocide with the water.

11 Claims, 4 Drawing Sheets

WATER PURIFIER WITH ADJUSTABLE VOLUME IN DWELL PASSAGE

This Appln is a 371 of PCT/US97/22101, Dec. 5, 1997, which is a con of application Ser. No. 08/761,651, Dec. 6, 1996, now U.S. Pat. No. 5,908,553.

BACKGROUND OF THE INVENTION

1. Field of the Invention

Embodiments of the present invention relate to water processing and to systems for purifying drinking water.

2. Background

As an introduction to problems solved by the present invention, consider the conventional water filter of the type described in U.S. Pat. No. 5,407,573 to Hughes, U.S. Pat. No. 4,888,118 to Barnes, and U.S. Pat. No. 5,401,399 to Magnusson, each incorporated herein by this reference. Such a filter has a generally axial flow of water from inlet to outlet ports. Influent water is imparted with a biocide, after which the water flows for a duration through an otherwise empty cavity sometimes referred to as an extended time chamber. While in the extended time chamber, time is allowed for the biocide to react with and kill bacterial and viral microorganisms in the water.

A greater disinfectant rate, i.e., kill rate, is possible by maintaining contact for a longer duration. However, using conventional techniques, extended time chambers having high kill rates are bulky in volume, limited in maximum flow rate, heavy, awkward to maintain, and expensive to manufacture due to the overall size required for extended time chambers in linear flow water filters.

In many applications of water purifiers, small size, light weight, and convenient maintenance are extremely important. Water purifiers are used in portable applications from patient care in hospitals, clinics, and emergency facilities to personal uses by hikers and rescuers. A variety of water purifiers are used in food and beverage manufacturing and dispensing throughout the world.

In view of the problems described above and related problems that consequently become apparent to those skilled in the applicable arts, the need remains in water purifiers for more effective apparatus capable of processing higher flow rates in a small, light weight package.

SUMMARY OF THE INVENTION

Accordingly a water purifier in one embodiment of the present invention includes a head and a pressure vessel. The vessel has a cavity. The head includes an influent passage for receiving the water and an effluent passage. The vessel includes a first passage in fluid communication with the influent passage and a second passage in fluid communication with the effluent passage. The first passage includes a treating system for increasing a biocide concentration in the fluid and an opening for discharging treated fluid into the cavity. The second passage includes a filtering system that receives the discharged treated fluid from the cavity for decreasing the concentration.

According to a first aspect of such a purifier, the effectiveness of the biocide in the water is proportional to the volume of the cavity and the flow rate of water through the purifier. For purifying a different flow rate, or for purifying the same flow rate more effectively, a vessel having a different cavity volume can be used in place of the original vessel.

According to another aspect, as opposed to a linear flow filter installed for inlet and outlet ports in coaxial or juxtaposed in parallel arrangement, the purifier of the present invention is characterized by more efficient use of its interior volume. Smaller and lighter purification apparatus results.

A water purifier according to another embodiment includes a dwell passage having a casing or partition. The partition has a plurality of holes allowing passage of the water through, rather than around, the partition. According to a first aspect of such an embodiment, the purifier is adaptable to efficiently process a lower flow rate by forming additional holes in the partition. Hence, when the dwell passage is too long, the flow path is easily shortened to accommodate changing circumstances, different fluids, or customer tailored installations. According to another aspect, the casing surrounds a replaceable cartridge. Water treated with a biocide is discharged from the cartridge. Discharged, treated water re-enters the cartridge after passing for a period of time through a dwell passage outside of the cartridge. By arranging the dwell passage outside the cartridge, the same cartridge can be marketed to many flow and purification applications having various sizes of pressure vessels, saving on manufacturing tooling, testing, and handling costs.

The present invention is practiced according to a method in one embodiment for increasing the effectiveness of a biocide in a water purifier. The water purifier includes a cartridge operative within an enclosure. The enclosure is characterized by a first volume that retains water in contact with the biocide. The method includes the step of replacing the enclosure with a second enclosure characterized by a second volume larger than the first volume.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DESCRIPTION OF THE PREFERRED EMBODIMENTS

Figure 1:
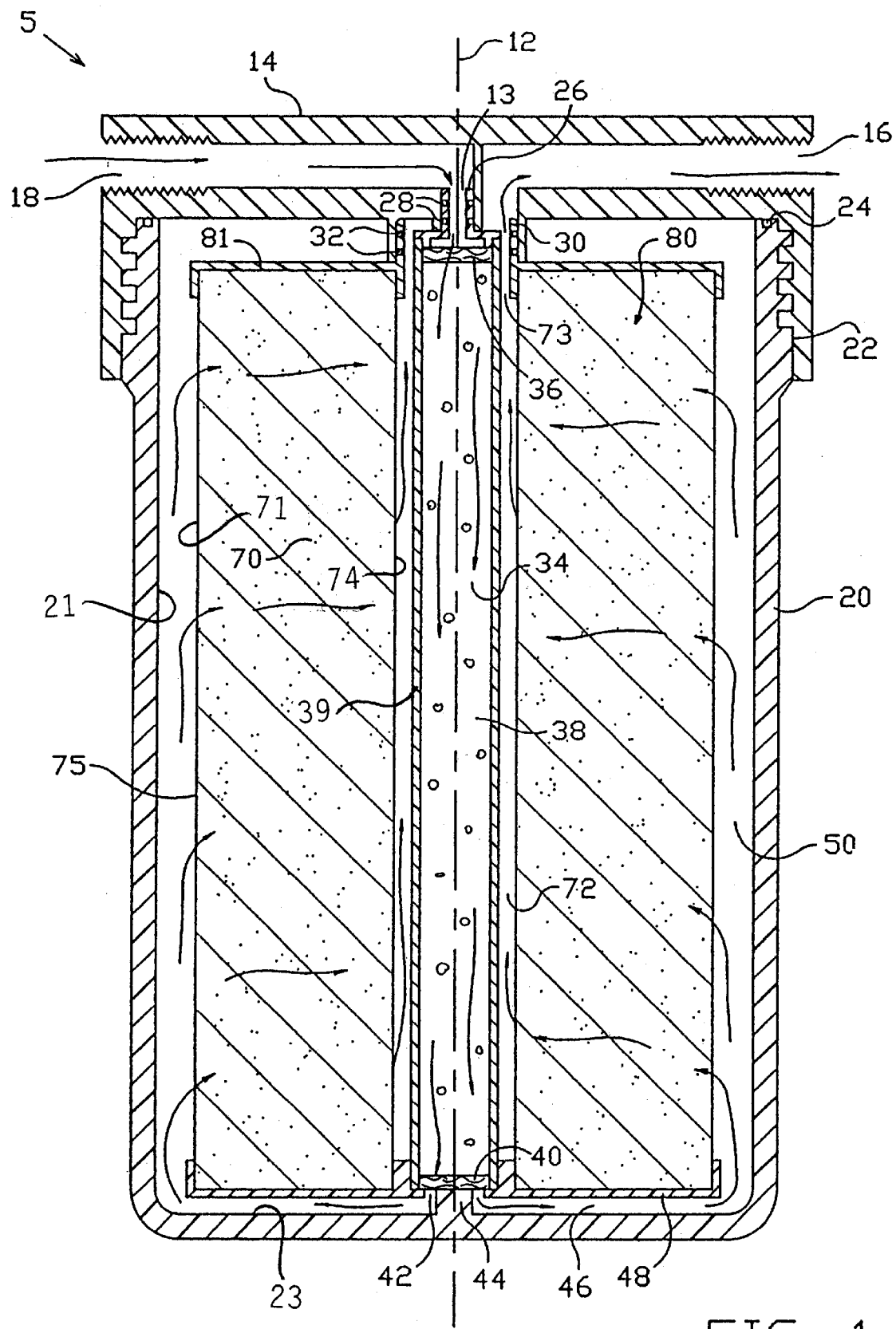
FIG. 1 is a cross section of a cylindrical water purifier in one embodiment of the present invention.

FIG. 1 is a cross section of a water purifier in one embodiment of the present invention. Water purifier 5 is cylindrical about a central axis 12 and has a substantially circular symmetry about that axis. Structural members of water purifier 5 are manufactured from polypropylene by conventional molding, extrusion, and machining operations. Water purifier 5 includes head 14, canister 20, and cartridge 80. Head 14 and canister 20 together constitute a housing for cartridge 80, which in some applications is replaceable, allowing the housing to be reused with a new or renewed cartridge. Cannister 20 comprises peripheral sidewall 21 and bottom wall 23.

On installation, head 14 is connected to a water supply at the influent portion 18 of the influent passage and to a downstream device at an effluent portion 16 of the effluent passage. Cartridge 80 is inserted into head 14 by inserting neck 26 and shoulder 30 into head 14. As canister 20 is threaded into threaded bore 22, post 44 urges cartridge 80 further into sealing relationship with head 14. O-rings 24, 28, and 32 provide a removable fluid seal between cartridge 80 and head 14. In operation, water flow through water purifier 5 is described as flowing in sequence through an influent passage, a dwell passage, and an effluent passage. The influent passage includes influent portion 18 in head 14, central opening 13 in neck 26, and chamber 38 which is defined by central tube 39 and filled with iodine treated resin granules 34. Water flow is considered to be axial through chamber 38 because inlet and outlet are arranged on a common axis and the chamber contents are homogeneous, not containing flow directing surfaces or devices.

Granules 34 are retained in chamber 38 by polyurethane foam pads 36 and 40, which also remove debris from the water and maintain the granules firmly packed and thereby help to prevent channeling. The granules 34 and foam pads 36 and 40 together define a water treatment system contained within the hollow interior or chamber 38 of tubular conduit or central tube 39. Granules 34 impart a biocide to the water, for example, iodine ions. Equivalent biocides include, for example, iodinated polyvinylpyridine of the type disclosed in U.S. Pat. No. 4,594,392, incorporated herein by this reference, and conventional halogenated resins in loose powder, bead, or sintered porous block form.

Water with biocide flows from the influent passage through a radially spaced holes 42 into the dwell passage. Chamber 38 is joined with conventional hot glue to cartridge base 48 that seals the influent passage from the effluent passage, preserving the fluid flow integrity of the dwell passage. Equivalent joining techniques include, for example, using fasteners, screws threads, or a bayonet, sonic or other conventional welding, swaging, and forming for press fit.

The dwell passage includes a first nonaxial portion 46 and a first axial portion 50. Dwell passage portions 46 and 50 are open cavities containing no filtering or processing apparatus. Water flow in dwell passage portion 46 is nonaxial in part because the inlet and outlet are not arranged on one axis. Though flow in the embodiment shown is primarily radial, due to the relative dimensions of the passage shown, flow is also considered nonaxial in an alternate canister having a comparatively large cavity below cartridge 80. Note that although a portion of the influent and effluent passages are within the external diameter of the cartridge, some portions of the dwell passage are not.

As water flows through portions 46 and 50, the biocide imparted to the water in the influent passage mixes with the water, killing microorganisms and other pathogens, sterilizing the water. Such sterilization proceeds over time. Time in the dwell passage is dependent on flow rate through the water purifier. As a consequence of the flow pattern in water purifiers of the present invention, the dwell time in the dwell passage is easily adjusted in response to a demand for increased water flow rate. When water flow rate is to be increased, canister 20 is replaced with a canister having a larger volume in dwell passage portion 46, 50, or both 46 and 50. An acceptable level of sterilization is then provided on the increased flow without replacing the cartridge, though the cartridge may require more frequent replacement.

The effluent passage includes axial portion 72, radially spaced holes 73 through shoulder 30, and an effluent portion 16 of head 14. Filter block 75 of the filter cartridge 80 is preferably a solid cast carbon block 70 with outer surface 71 and inner surface 74, having a nominal porosity of 0.5 microns to reduce the concentration of volatile organic contaminants, chemicals, parasites, sediment, biocide, and consequent suspended and dissolved materials including killed microorganisms and pathogens. Water flow in portion 72 is considered axial in aggregate, though fed from a surface rather than a coaxial opening.

In summary, water flow through water purifier 5 includes a dwell passage having a nonlinear, circuitous portion. Flow directions in passages 46 and 50 are dissimilar and in part opposite, promoting longer duration of exposure to biocide, adjustable dwell time, and better mixing of biocide with the water. These attributes promote more effective purification, more effective sterilization, and consequently wider application of water purifier 5 over known devices.

Figure 2:
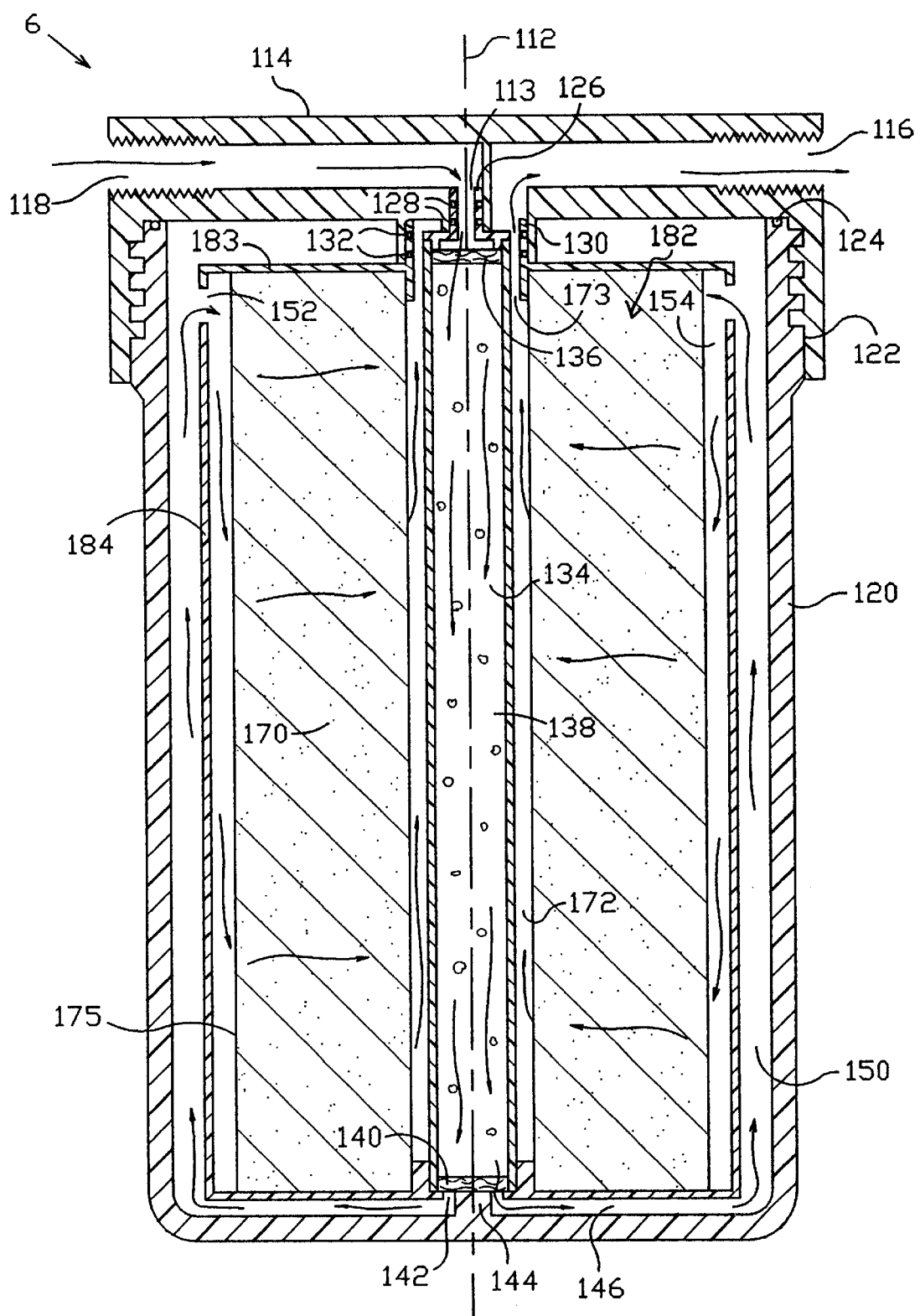
FIG. 2 is a cross section of a cylindrical water purifier in another embodiment of the present invention.

FIG. 2 is a cross section of a water purifier in another embodiment of the present invention. Water purifier 6 is cylindrical about a central axis. Numbered items in FIG. 2 correspond in structure and function to the items in FIG. 1 that are numbered one hundred less. Water purifier 6 uniquely includes cartridge 182. Cartridge 182 includes cartridge cap 183 joined conventionally to cartridge body 184. Cartridge body 184 and cap 183 form an exterior casing surrounding the filter portion and effluent passage of cartridge 182.

Water flow through the dwell passage of water purifier 6 proceeds through first nonaxial portion 146 and first axial portion 150, through radially spaced holes 152 and into second axial portion 154. Water flow re-enters cartridge 182 from dwell passage first axial portion 150 through radially spaced holes 152. Cartridge body 184 serves as a partition, dividing the dwell passage into two portions 150 and 154. By admitting water only at the furthest axial extent of portion 150, the minimum dwell time is improved over that for water purifier 5, discussed above.

Figure 3:
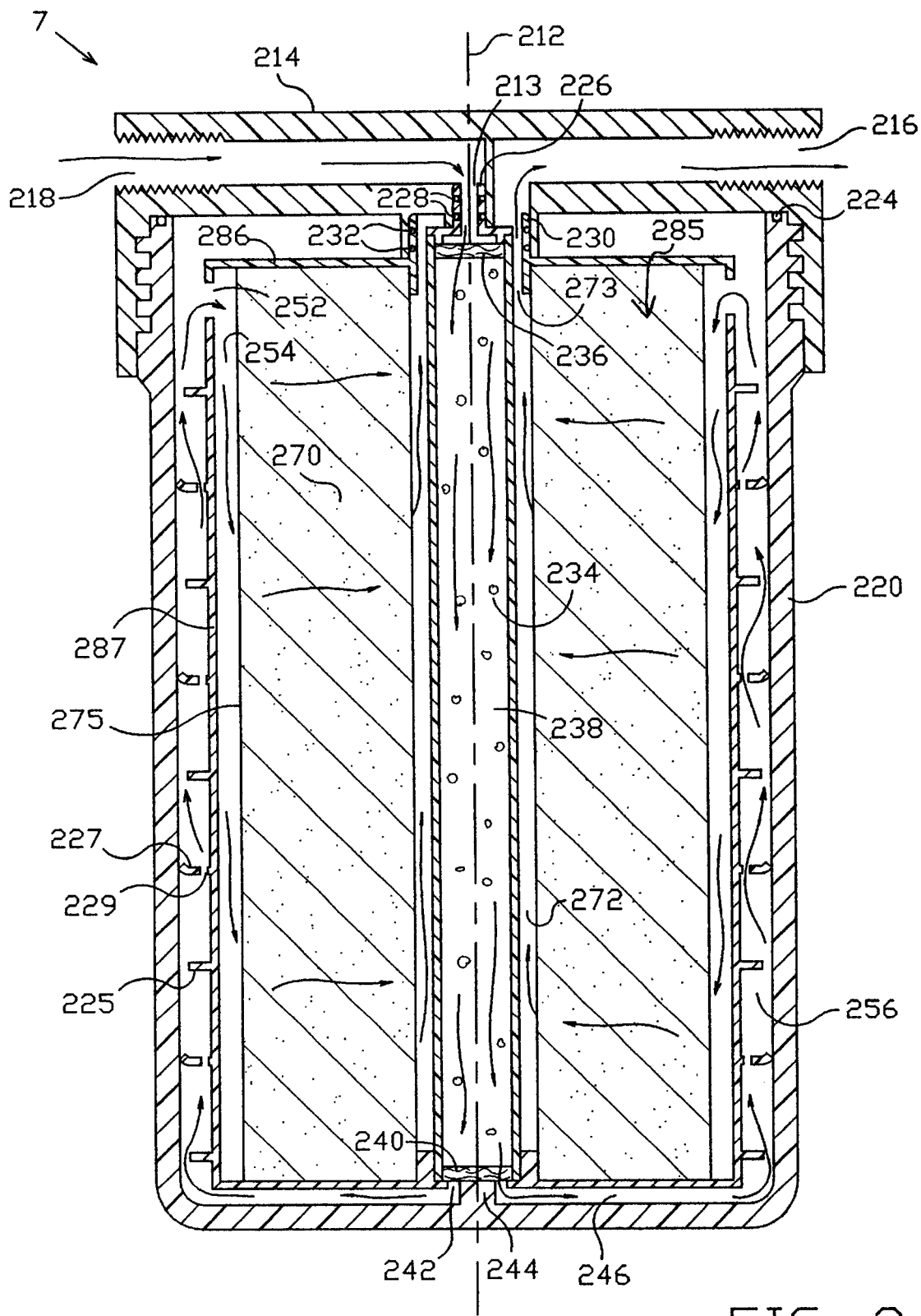
FIG. 3 is a cross section of a cylindrical water purifier in yet another embodiment of the present invention.

FIG. 3 is a cross section of a water purifier in yet another embodiment of the present invention. Water purifier 7 is cylindrical about a central axis. Numbered items in FIG. 3 correspond in structure and function to items in FIGS. 1 and 2 that are numbered two hundred less or one hundred less, respectively. Water purifier 7 uniquely includes cartridge 285. Cartridge 285 includes cartridge cap 286 joined conventionally to cartridge body 287. Cartridge body 287 and cap 286 form an exterior casing surrounding the filter portion and effluent passage of cartridge 285.

Cartridge body 287 serves as a partition, dividing the dwell passage into two portions 256 and 254. Cartridge body 287 includes a series of baffles formed as annular ribs encircling cartridge body 287 for interrupting, e.g. obstructing, linear water flow over the exterior surface of body 287. Baffles are of two diameters: a smaller diameter baffle 225 allows water passage around the extremity of the baffle; and a larger diameter baffle 227 predominantly permits water flow through radially spaced holes 229. Baffles of the larger diameter similar to baffle 227 fit snugly against the inside surface of canister 220. Each baffle operates merely to mix the biocide into the water, enhancing sterilization, by obstructing linear flow. Therefore, no sealing relationship need exist between larger diameter baffles and canister 220.

Water flow through the dwell passage of water purifier 7 proceeds through first nonaxial portion 246, through second nonaxial portion 256, through radially spaced holes 252, and into first axial portion 254. Thus, water flow reenters cartridge 285 from dwell passage second nonaxial portion 256 through radially spaced holes 252.

Turbulent flow in water purifier 7 increases exposure of biocide to microorganisms and pathogens over water purifiers 5 and 6, discussed above. Introducing baffles into passage 256 promotes mixing which improves exposure.

In an alternate and equivalent embodiment, all baffles fit against canister 220, however linear flow is obstructed by aligning the respective radially spaced holes on different clockings about axis 212.

Figure 4:
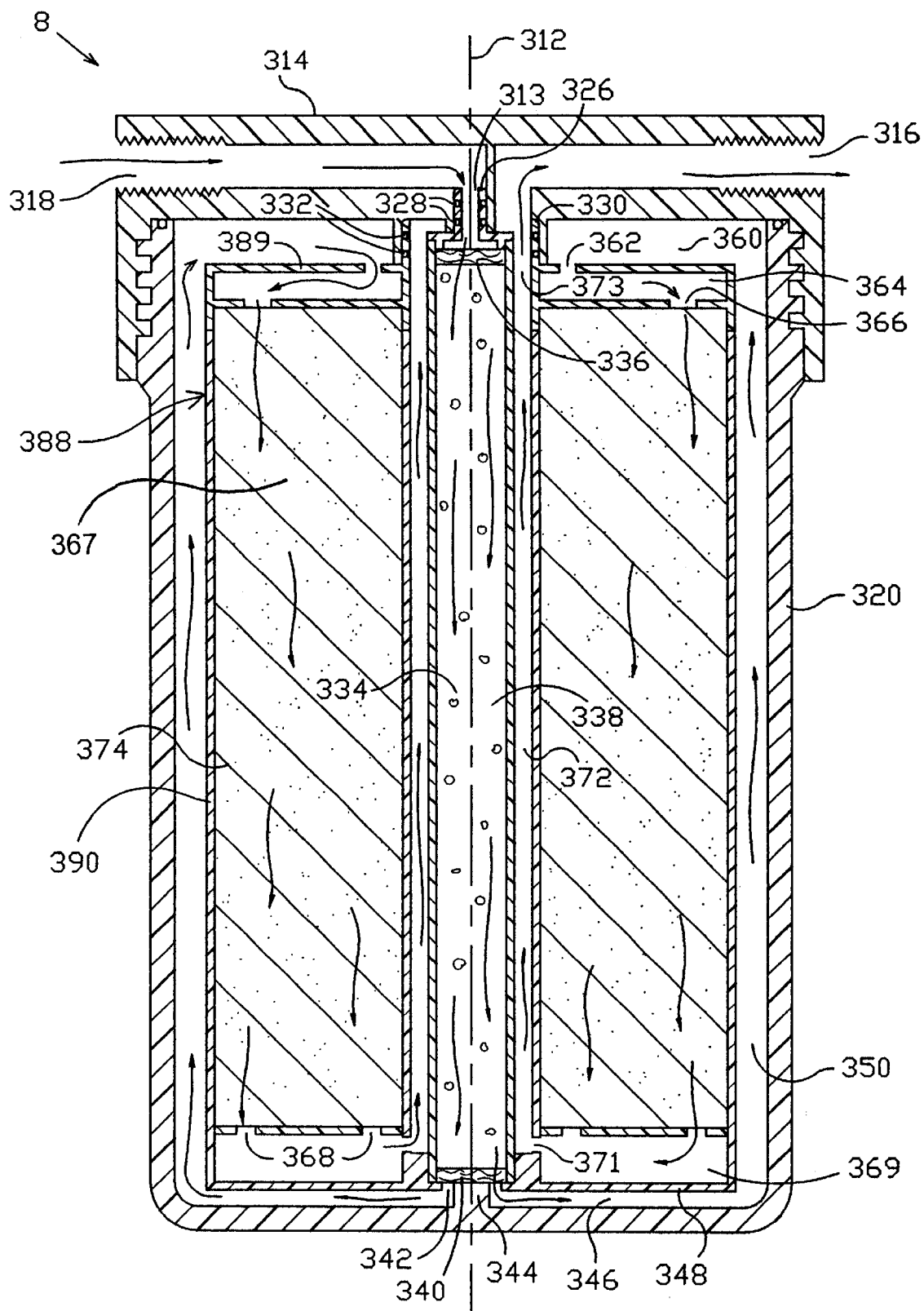
FIG. 4 is a cross section of a cylindrical water purifier in still another embodiment of the present invention.

FIG. 4 is a cross section of a water purifier in still another embodiment of the present invention. Water purifier 8 is cylindrical about a central axis. Numbered items in FIG. 4 correspond in structure and function to items in FIGS. 1, 2, and 3 that are numbered three, two, or one hundred less, respectively. Water purifier 8 uniquely includes cartridge 388. Cartridge 388 includes cartridge cap 389 conventionally joined to cartridge body 390 and granular filter material 367.

Water flow through the dwell passage of water purifier 8 proceeds through first nonaxial portion 346, through first axial portion 350, through second nonaxial portion 360, through first radially spaced holes 362, and into third nonaxial portion 364 and then through holes 366 to portion 374. Thus, water flow re-enters cartridge 388 from dwell passage first axial portion 350 through radially spaced holes 362. By admitting water to the cartridge only at the furthest axial extent of portion 360, the minimum dwell time is improved over that for water purifiers 5, 6, and 7, discussed above.

The effluent passage of water purifier 8 includes axial portion 374, accumulator passage 369, radially spaced holes 371, axial passage 372, and portion 316 of head 314. To provide the same function as carbon block filter 70, 170, and 270 in water purifiers 5, 6, and 7 respectively, effluent passage portion 374 is filled with granular activated carbon filter material 367.

In all of the above embodiments, holes described as radially spaced describe a ring of holes at substantially the same radius from a central axis. Such holes are essentially circumferentially spaced holes. In alternate and equivalent embodiments, hole patters are randomly distributed, distributed on the arms of a star pattern, are replaced by slots, or are replaced by openings formed between structural elements.

Canisters 20, 120, 220, and 320 exemplify cylindrical pressure vessels. In alternate and equivalent embodiments, a pressure vessel having other than circular cross section is used, including elongated polygon, square, and spherical vessels. In still further alternate embodiments, the cartridge is integral to the vessel. In such embodiments, a partition formed in the vessel serves the functions described for the cartridge body in the illustrated embodiments.

Treating means for increasing a biocide concentration in water include materials including resins that impart a biocide such as a reactant, a catalyst, or an organic material or organism.

Filtering means for decreasing a concentration of biocide in water include conventional filters, as well as materials including resins that trap or absorb ions, chemicals, and organic matter.

The foregoing description discusses preferred embodiments of the present invention, which may be changed or modified without departing from the scope of the present invention. Alternate and equivalent water purifiers having the same dwell passage flow pattern use various known means for imparting biocide to the water and known means for removing biocide and other particulates and dissolved substances from the water. For example, alternate and equivalents for filter blocks 75, 175, and 275 include an outside layer of filter material to obstruct the flow of debris including microscopic materials. These and other changes and modifications are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

What is claimed is:

1. An apparatus for purifying water comprising:
    a vessel including a peripheral sidewall surrounding a central axis, a closed bottom wall, and an open top;
    a filter head for closing the open top of said vessel, said filter head including an in fluent passage coaxially aligned with said central axis and an effluent passage spaced radially outwardly from said in fluent passage; and
    a removable cartridge received within the interior cavity and removably sealed to the filter head so that the cartridge is in fluid communication with the in fluent passage and the effluent passage, the cartridge comprising:
        an imperforate tubular conduit having a hollow interior, an upper open end sealed to said in fluent passage, a lower open end positioned proximate to and spaced apart from the closed bottom wall of said vessel;
    a water treating system contained within said hollow interior comprising a material for imparting a biocide to water flowing through said conduit;
    a tubular filter coaxially surrounding said conduit and comprising a material for reducing a concentration of biocide from water, wherein said filter defines an exterior surface spaced apart from the peripheral wall of said vessel to define a first annular passage therewith and wherein said filter includes an interior surface radially spaced apart from said conduit to define a second annular passage extending axially to said effluent passage;
    a base for closing a lower end of said filter, said base including a seal for closing a lower end of said second annular passage, wherein said base includes a lower surface that is spaced apart from the bottom wall of said vessel to define a radial passage extending from the lower open end of said conduit to said first annular passage;
    a cap member for closing an upper end of said filter, wherein said cap member includes a seal for sealingly connecting an upper open end of said second annular passage to said effluent passage;
    whereby water to be treated flows into said in fluent passage in said filter head, from said in fluent passage into the upper open end of said conduit, through the interior of said conduit and through said material for imparting biocide held therein, from the interior of said conduit out of the lower open end of said conduit, from the lower open end of said conduit into said radial passage, from said radial passage into said first annular passage, from said first annular passage through said filter, from said filter into said second annular passage, from said second annular passage through the upper open end of said annular passage, and from the upper open end of said second annular passage into said effluent passage for discharge from said filter head.

2. An apparatus as in claim 1, wherein the means for imparting biocide comprises a granular resin.

3. An apparatus as in claim 1, wherein the filter means comprises activated carbon.

4. An apparatus as in claim 3, wherein the activated carbon is in block form.

5. An apparatus for purifying water comprising a cartridge housing and a cartridge, the housing having a housing top, a housing bottom wall, a housing peripheral sidewall, and an interior cavity, wherein the housing top has an in fluent passage and an effluent passage; and wherein the cartridge has a cartridge top and a cartridge bottom, the cartridge being secured inside the cavity spaced apart from the housing bottom wall and apart from the housing peripheral sidewall, so that there is a dwell passage radial portion below the cartridge and a dwell passage axial portion around the cartridge, wherein the dwell passage radial portion and the dwell passage axial portion are in fluid communication; the cartridge further comprising:
- a central tube having a chamber containing a biocide media, an opening at a first end at or near the cartridge top, which is in fluid communication with the housing in fluent passage, and an opening at a second end at or near the cartridge bottom which is in fluid communication with the dwell passage radial portion;
- a filter comprising biocide-removal media, the filter extending generally coaxially around the central tube, the filter having an inner surface spaced from the central tube and defining therewith an axial effluent passage extending generally coaxially around the central tube between the central tube and the filter, wherein the axial effluent passage is closed at its bottom end and has an opening at its top end in fluid communication with the effluent passage;
- wherein the filter is in fluid communication with the axial effluent passage; the filter further having an outer surface in fluid communication with the dwell passage axial portion;
- wherein the apparatus is adapted to direct water from the in fluent passage into the central tube to impart a biocide to the water, and out of the central tube water outlet into the dwell passage radial portion; and
- wherein the apparatus is adapted so that water flows from the dwell passage radial portion into the dwell passage axial portion, though the filter so that biocide is removed from the water, into and then up through the axial effluent passage to the effluent passage.

6. A cartridge as in claim 5, wherein the filter comprises a granular resin.

7. A cartridge as in claim 5, wherein the filter comprises activated carbon.

8. A cartridge as in claim 7, wherein the activated carbon is in block form.

9. A cartridge as in claim 5, further comprising a cartridge base at the cartridge bottom end which closes the axial effluent passage bottom end and which seals to the central tube second end.

10. A cartridge as in claim 5, further comprising a cartridge body including a cartridge base for closing a lower end of said filter, wherein said base includes a lower surface that is spaced apart from the housing bottom wall to define said dwell passage radial portion, the cartridge body further including a cartridge body side wall extending axially into the dwell passage axial portion to near the cartridge top and having radially spaced holes near the cartridge top in fluid communication with the filter so that water flows from the dwell passage radial portion to near the cartridge top and through the radially spaced holes to access the filter.

11. A cartridge as in claim 10, wherein the cartridge body side wall further comprises water baffles extending radially into the dwell passage axial portion.

* * * * *